(12) United States Patent
Abel

(10) Patent No.: US 8,780,714 B2
(45) Date of Patent: *Jul. 15, 2014

(54) METHOD FOR OPTIMIZING NEAR FIELD LINKS

(71) Applicant: Microsoft Corporation, Redmond, WA (US)

(72) Inventor: Miller T. Abel, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,258

(22) Filed: Mar. 15, 2013

(65) Prior Publication Data

US 2013/0230082 A1 Sep. 5, 2013

Related U.S. Application Data

(63) Continuation of application No. 11/855,913, filed on Sep. 14, 2007, now Pat. No. 8,400,913.

(60) Provisional application No. 60/939,827, filed on May 23, 2007.

(51) Int. Cl.
*H04J 1/16* (2006.01)
*G01R 31/08* (2006.01)
*H04L 1/00* (2006.01)

(52) U.S. Cl.
USPC .......................................................... 370/230

(58) Field of Classification Search
None
See application file for complete search history.

(56) References Cited

U.S. PATENT DOCUMENTS

| | | |
|---|---|---|
| 5,437,057 A | 7/1995 | Richley et al. |
| 5,822,538 A | 10/1998 | Krishna et al. |
| 6,298,239 B1 | 10/2001 | Yonemoto et al. |
| 6,424,820 B1 | 7/2002 | Burdick et al. |
| 6,487,179 B1 | 11/2002 | Leung |
| 7,046,382 B1 | 5/2006 | Chu |
| 7,375,616 B2 | 5/2008 | Rowse et al. |
| 7,426,569 B2 | 9/2008 | Dunk |
| 8,400,913 B2 | 3/2013 | Abel |
| 2002/0172178 A1 | 11/2002 | Suzuki et al. |

(Continued)

FOREIGN PATENT DOCUMENTS

| | | |
|---|---|---|
| JP | 2005-204254 A | 7/2005 |
| RU | 2297173 C2 | 4/2007 |
| WO | WO 2006/077418 A1 | 7/2006 |

OTHER PUBLICATIONS

Braaksma, A., "Near Field Communication (NFC)," *FreeNovation Online Magazine*, 2006, 1-2.

(Continued)

*Primary Examiner* — Mark Rinehart
*Assistant Examiner* — Maharishi Khirodhar
(74) *Attorney, Agent, or Firm* — Sung Kim; Andrew Sanders; Micky Minhas

(57) ABSTRACT

In a Near Field Communications (NFC) link, the data link turn-around time is adjusted to optimize battery use while maximizing the data throughput. A receiving device immediately transmits any pending high priority control or data messages in its own queue in response to a message from the sending device, subject to the flow control status of the sending device. The value of the delay time before sending a SYMM primitive is selected in accordance with the types of link frames recently received.

20 Claims, 9 Drawing Sheets

(56) References Cited

U.S. PATENT DOCUMENTS

| | | |
|---|---|---|
| 2003/0195001 A1 | 10/2003 | Tari et al. |
| 2005/0027818 A1 | 2/2005 | Friedman et al. |
| 2005/0077356 A1 | 4/2005 | Takayama et al. |
| 2005/0226275 A1* | 10/2005 | Hrycaj et al. ............ 370/474 |
| 2006/0052055 A1 | 3/2006 | Rowse et al. |
| 2006/0094356 A1 | 5/2006 | Dawidowsky |
| 2006/0217072 A1 | 9/2006 | Poyhonen et al. |
| 2007/0026825 A1 | 2/2007 | Wilson |
| 2007/0057851 A1 | 3/2007 | Leizerovich et al. |
| 2007/0066273 A1 | 3/2007 | Laroia et al. |
| 2007/0099679 A1 | 5/2007 | Saarisalo |
| 2007/0140193 A1* | 6/2007 | Dosa et al. ............ 370/338 |
| 2007/0230393 A1 | 10/2007 | Sinha et al. |
| 2008/0039032 A1 | 2/2008 | Haumont |
| 2008/0159163 A1 | 7/2008 | Valli |
| 2008/0233905 A1 | 9/2008 | Mohanty et al. |
| 2009/0017810 A1 | 1/2009 | Harsch |

OTHER PUBLICATIONS

"Near field communication (NFC)—opening for new business," http://wiki.unk.no/index/php/Rfidtutorial/HomePage?action=backlinks, 2007, downloaded May 15, 2007, 3 pages.

Sony Corporation, "Near Field Communication," http://www.ecma-international.org/activities/Communications/TC32tg19_110603.old.pdf, downloaded 2007, 1-7.

* cited by examiner

METHOD FOR OPTIMIZING NEAR FIELD LINKS

CROSS REFERENCE TO RELATED APPLICATIONS

This application is a continuation of U.S. Nonprovisional application Ser. No. 11/855,913, filed Sep. 14, 2007, now U.S. Pat. No. 8,400,913, issued Mar. 19, 2013, which claims the benefit of U.S. Provisional Application No. 60/939,827, filed May 23, 2007, incorporated herein by reference in its entirety.

BACKGROUND

Various forms of wireless communications protocols provide an effective means for devices to quickly and easily establish communications. For example, Near Field Communication (NFC) enables communication between consumer electronics devices without the need for physical connectors and user configuration. Typically, two NFC devices communicate when they are brought together in close physical proximity or by causing them to physically touch, thus engaging the devices' interfaces and configuring them to establish a peer-to-peer network. Examples of how NFC can be used include the downloading of digital photos from a camera enabled cell phone by touching the phone to an enabled computer, television, printer, or digital picture frame, and downloading applications or games to a handheld device by touching the device to the computer.

NFC is a very short-range wireless technology with distances measured in centimeters. The devices' NFC interfaces typically connect and configure themselves automatically to form a peer-to-peer network. The communication link is typically half-duplex, using a strictly turn-taking methodology with one device sending and the other device responding with data or control information of its own before the first device may send new information. In the event that neither device has data to send, an empty frame, or symmetry primitive (SYMM) is sent. The transmission of the SYMM primitive allows the sending device to regain use of the link when the receiving device has no data to send. When neither device has data or control information to send, SYMM primitives will be sent in both directions, and the link may be said to be idle.

Active transmission requires device power, and the continuous transmission of SYMM primitives when no data is actually being exchanged represents an unnecessary drain on the battery resources of portable devices. In this case, it is desirable to maximize the turnaround time without causing a communications failure. However, when data is being transmitted, it is desirable for data throughput to be maximized by allowing the sending device to regain control of the link as soon as possible. In that case, the fastest possible turnaround time is desirable. Similar problems arise in other forms of half duplex communications links.

Therefore, what are needed are methods and systems that are able to efficiently transmit and receive without unnecessarily consuming power, thereby prolonging the battery charge. Reducing the power consumption of the device increases the time between recharging (if the battery is rechargeable) and/or increases the useful life of the battery (and in some cases the device itself) thereby prolonging periods between replacement. The methods and systems disclosed herein address these shortcomings

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The methods and systems disclosed herein adjusts data link turn-around time in the receiver to optimize battery use while maximizing the data throughput. A receiving device immediately transmits any pending high priority control or data messages in its own queue in response to a message from the sending device, subject to the flow control status of the sending device.

When the receiving device has no pending control or data messages to transmit, or the sending device is not ready to receive, the NFC Logical Link Control Protocol (LLCP) Technical Specification requires the device to send a SYMM after delaying not longer than a specified maximum data link turnaround time. The methods and systems disclosed herein selects the value of the delay time before sending a SYMM primitive (or its equivalent) in accordance with the types of link frames recently received.

If the device has recently received an information frame (either an Information (I) or Unnumbered Information (UI) frame), then the SYMM primitive is sent as soon as possible to enable the sending device to quickly regain control of the link and continue its transmission. This represents a minimal turnaround time.

If the last received frame was a SYMM primitive, the receiving device will delay sending a SYMM primitive by a time period that increases the longer the link remains idle. To accomplish this, the turnaround time during idle periods may be embodied as the product of an idle factor and an idle delay. The idle delay is a time duration. The idle factor may be, for example, computed as follows: When the link is first established, or when an information frame (either an I or UI frame) is received, the idle factor is set to zero. Each time a SYMM primitive is received, the idle factor is increased. Each time a link control primitive other than SYMM is received, the idle factor is decreased or reset to zero. The turnaround time, which is the product of the idle factor and the idle delay, varies between zero and some maximum value, scaled by the idle factor.

If the device has most recently received a link control primitive other than the SYMM primitive, and has not recently received an information frame, then the turnaround time can be determined (or idle factor adjusted) according to the type of the received control primitive.

The methods and systems disclosed herein describe various embodiments using an NFC protocol, but can be applied generally to half duplex links.

BRIEF DESCRIPTION OF THE DRAWINGS

The methods and systems disclosed herein are further described with reference to the accompanying drawings in which.

DETAILED DESCRIPTION

Certain specific details are set forth in the following description and figures to provide an understanding of various embodiments of the methods and systems described herein. Certain well-known details, associated electronics and communications methods are not set forth to avoid unnecessarily obscuring the various embodiments. Further, it will be understood by those of ordinary skill in the relevant art that other embodiments of the described methods and systems can be practiced without one or more of the details described below. In particular, the methods and systems disclosed herein describe various embodiments using an NFC protocol, but can be applied generally to other types of links. Finally, while various processes are described with reference to steps and sequences, the descriptions are for providing a clear implementation of particular embodiments, and the steps and sequences of steps should not be taken as required to practice the methods and systems disclosed herein.

Example Computing Devices

Figure 1:
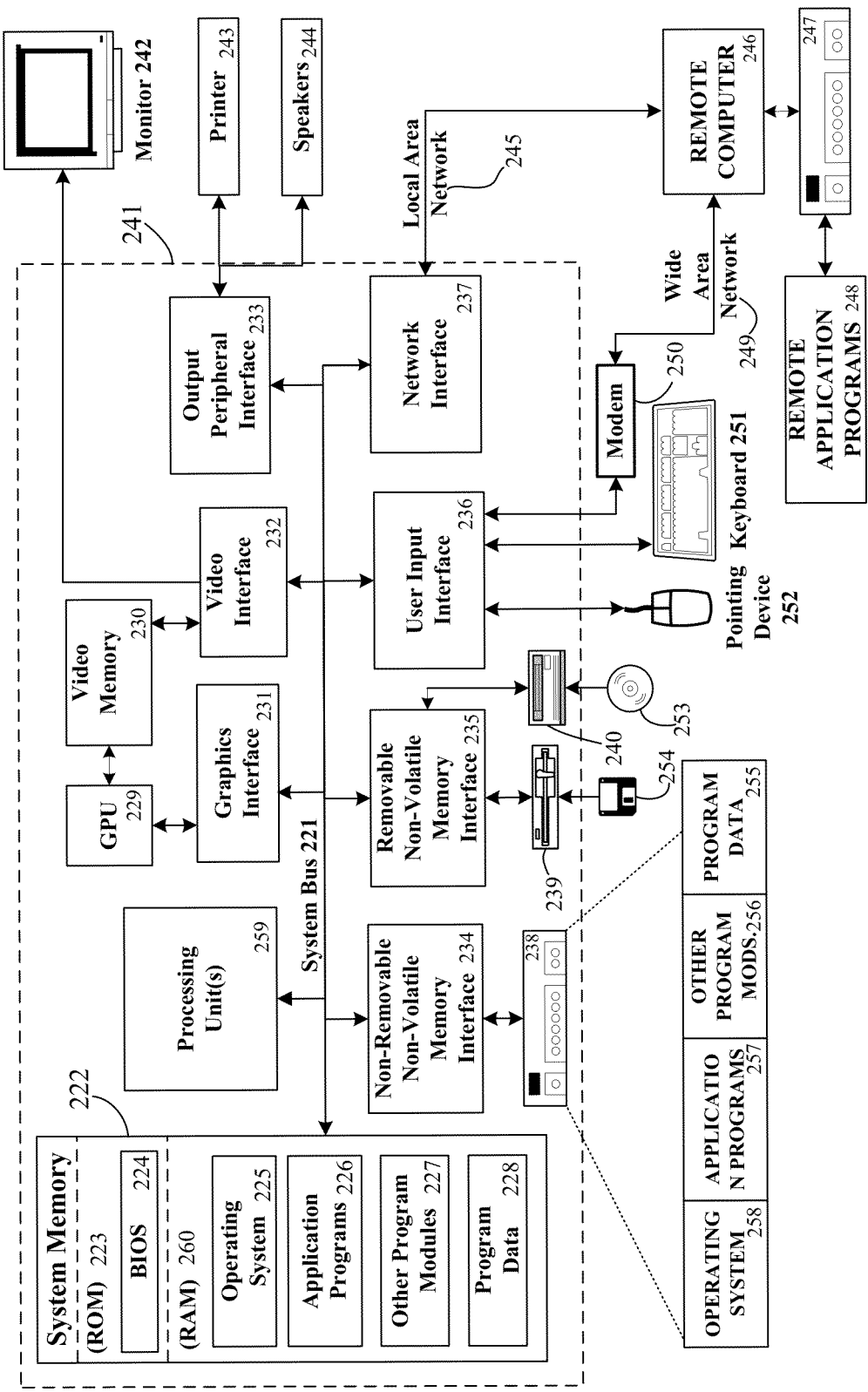
FIG. 1 is a block diagram representing an exemplary computing device suitable for use in conjunction with providing systems and methods for managing a near field communications link.

Referring to FIG. 1, shown is a block diagram representing an exemplary computing environment suitable for use in conjunction with the processes described below. For example, the computer executable instructions that carry out the processes and methods below may reside and/or be executed in one of the devices as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard, Secure Digital Input Output (SDIO), and Universal Serial Bus (USB).

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 241. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or use the processes described in connection with embodiments of the systems and methods described herein, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to using aspects of the invention in the context of one or more stand-alone computer systems, the embodiments disclosed herein are not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
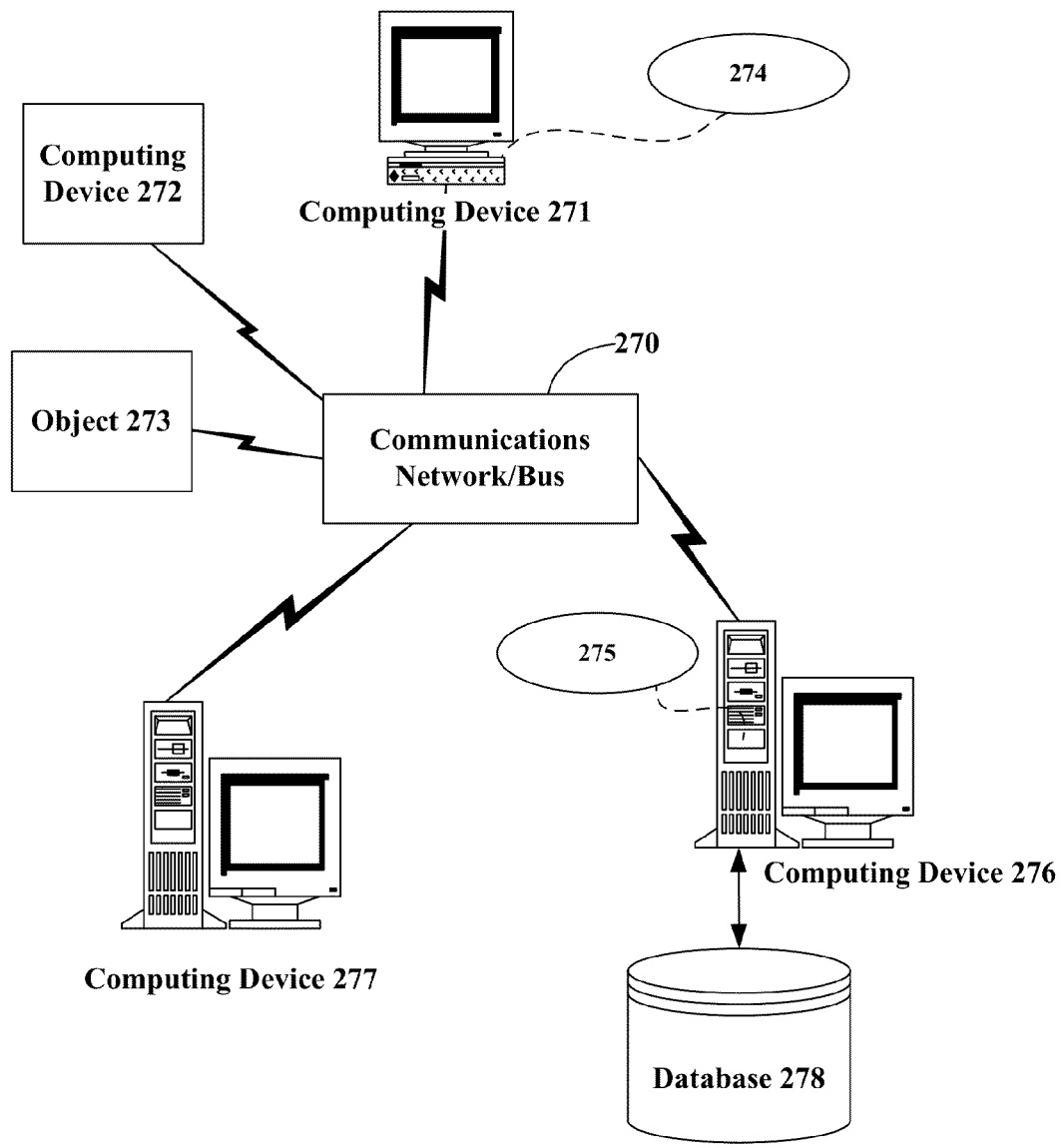
FIG. 2 illustrates an exemplary networked computing environment in which many computerized processes may be implemented to provide systems and methods for managing a near field communications link.

Referring next to FIG. 2, shown is an exemplary networked computing environment in which many computerized processes may be implemented to perform at least one of the processes described below. For example, parallel computing may be part of such a networked environment with various clients on the network of FIG. 2 using and/or implementing a system for implementing a universal consumer spending card. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277, and 278 may comprise or make use of programs, methods, data stores, programmable logic, etc. The entities 271, 272, 273, 274, 275, 276, 277, and 278 may span portions of the same or different devices such as PDAs, audio/video devices, MP3 players, personal computers, etc. Each entity 271, 272, 273, 274, 275, 276, 277, and 278 can communicate with another entity 271, 272, 273, 274, 275, 276, 277, and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277, and 278 may contain discrete functional program modules that might make use of an API, or other object, software, firmware and/or hardware, to request services of one or more of the other entities 271, 272, 273, 274, 275, 276, 277, and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277, and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another using the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

NFC Overview

Figure 3:
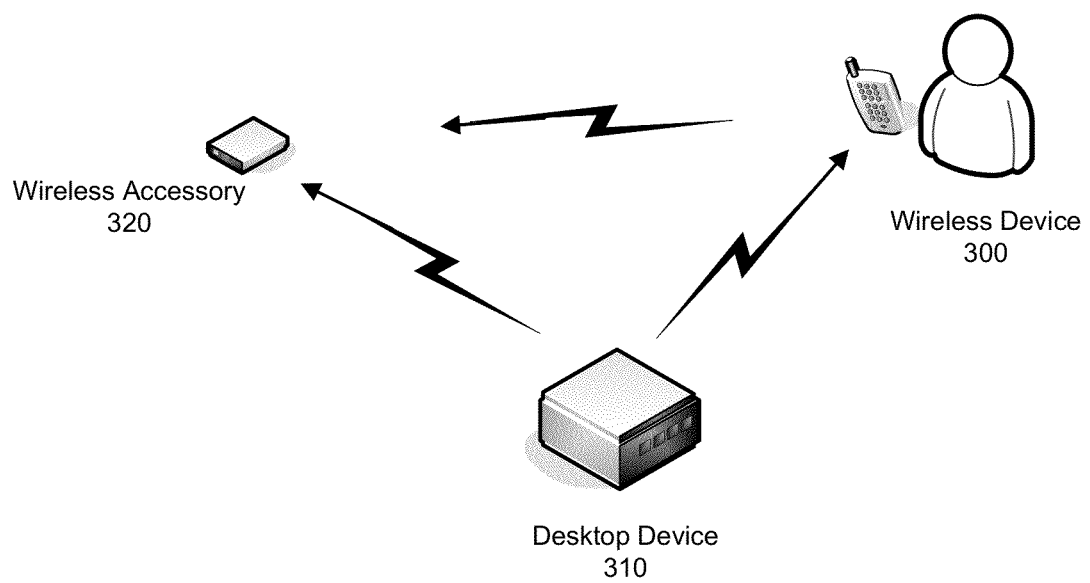
FIG. 3 illustrates an exemplary set of devices communicating using NFC.

The NFC protocol is based on a wireless interface and is typically designed to establish wireless network connections between computer peripherals and consumer electronics. NFC devices are radio frequency non-contact communications devices that can communicate wirelessly with other NFC devices over relatively short ranges. Generally, operating distances are on the order of 0~20 cm. FIG. 3 illustrates three typical devices in communication using NFC techniques. Communication is via inductive coupling of a magnetic field between the NFC device and a second NFC device. NFC devices can be implemented by means of a single integrated circuit or by means of separate functional component parts or separate integrated circuits.

NFC devices are inherently secure since the devices must be placed very close to each other in order to establish communication. Any intruding device must likewise be physically close in order to establish a rogue connection, and thus it is easy to control an NFC communication environment as compared to longer range wireless connection methods such as Bluetooth.

In NFC, the interfaces operate in the 13.56 MHz RF band. The band is typically unlicensed and thus licenses are not required to use this band. However, individual countries may impose specific limitations on the electromagnetic emissions in this band.

There are typically two participating devices participating in a given communication session. As is often the case with the devices sharing a single RF band, the communication is half-duplex. Such sessions are typically peer-to-peer communicating in a half-duplex fashion, in which communication is in both directions, but only one direction at a time (not simultaneously). Thus, once a device begins receiving a signal, it must wait for the transmitter to stop transmitting before responding. The devices implement the "listen before talk" policy—any device must first listen on the carrier and start transmitting a signal only if no other device can be detected transmitting. One skilled in the art can appreciate that the methods and systems described herein may be embodied in any number of half-duplex protocols and not limited to the NFC context.

The operation of NFC devices depends on whether they are operating as an "initiator" or a "target", and whether they are operating in a "passive communications mode" or an "active communications mode." Any device may be either an initiator or a target. The initiator is the device that initiates and controls the exchange of data. The target is the device that answers the request from the initiator.

An initiator NFC device will generate an RF field and start communication. A target device will respond to receipt of an RF field from an Initiator NFC device. Response will be through modulation of the supplied RF field or through generation of a new RF signal and modulation of that RF signal.

In the active mode both devices generate their own RF field to carry the data. In a "passive communications mode" the Initiator NFC Device will generate an RF field and the Target NFC device will respond to an Initiator command by modulation of the received RF signal, usually by load modulation. In an "active communications mode" both the Initiator NFC device and the Target NFC Device use their own RF field to enable communication.

The initiating application chooses the initial communication speed from the set of 106, 212 and 424 kbit/s. Subsequently, the application and/or the communication environment may require negotiation of the communication speed. Protocols use different modulation and bit encoding schemes depending on the speed. When establishing the communication session, the initiator begins the communication in a particular mode at a particular speed. The target determines the current speed and the associated low-level protocol responds accordingly. The communication is terminated either on command from the application or when a device moves out of range.

Passive mode is important for battery-powered devices since they must minimize the drain of power to conserve battery life. The device may be powered internally, but does not have to expend additional battery charge by energizing the RF transmitter and antenna. If two peer devices want to communicate without the need of any user interaction, each NFC device has to be continuously active.

It will be appreciated that the preceding examples are for purposes of illustration and explanation only, and that the various aspects of the present disclosure provided herein are not limited to such examples. For instance, other types of short range wireless links will face the same kinds of issues, which are generally applicable when half duplex communications are used. It is envisioned that the present disclosure may be applied to various forms of wired and wireless communications that use one or more of the synchronization features described above.

NFC Link Control

NFC devices may include a microprocessor or microcontroller for controlling the operation of the NFC device, a signal generator for generating an RF signal, a modulator for modulating the RF signal, a clock signal generator for providing a clock signal for the functional core, and data storage means for storing data. The various parts of the NFC device may be provided by one circuit, a number of circuits or integrated with a host system or apparatus.

The NFC device is typically coupled to additional system components by a connector. The system components may comprise a host system processor, a sensor, an actuator, or any other device that is capable of interacting with the NFC device's local environment. In operation an NFC device in initiator-mode transmits a modulated RF signal, and this signal is typically received by the NFC device via an inductive coupler.

The Logical Link Control Protocol (LLCP) defines the logical link between NFC devices and is based on the High-Level Data Link Control (HDLC) family of link layer control procedures (ISO/IEC 13239:2002). A link can hold one or more (logical) LLCP connections. The functionality of LLCP is built on the standard functionality of ISO/IEC 18092.

An LLCP block is split into four functional blocks. The "Link Setup" sub-block is responsible for the link setup establishment. Once the link establishment is performed, this sub-block becomes inactive and the operation is handed to the "Symmetry Provider". This sub-block is active as long as the remote NFC Forum device is within reach. This sub-block provides a symmetrical role model and is the precondition for the remaining functions of LLCP. The Link Manager is responsible for serializing all the connection-based as well as connection-less data exchanges, and provides error detection and error recovery handling. The connection and data transfer block is responsible for maintaining the connection-based connections.

The LLCP supports two different types of transport which are independent from each other. Connection-less transport provides a service which conveys data in an unreliable manner. The sender does not receive any feedback whether the data has actually been received by the remote peer. If the receiver is in a busy condition or if the data transmission was erroneous the local peer will not be notified. Moreover, this type of transport does not have any session context. Every frame consists of a Destination Service Access Point (SAP) and a Source SAP, which enables multiple connection-less data transfers over a single link. The destination port is typically related to a certain protocol. The source port is not interpreted by the LLC stack. The upper application may use the field as a handle to have a context between multiple frames.

Connection-less transport does not require any prior data link connection establishment and therefore no data link disconnection. Connection-oriented transport, also known as type 2, provides a channel which has the ability to reliably exchange data. Type 2 based connections are performed in three steps. First is Connection Establishment—to agree on a session context between the local and the remote peer. This can be initiated by any device. Second is Information Exchange—the actual data exchange, which can be performed in both ways. The data exchange is performed reliably, in-order and includes error recovery. Third is Connection Termination—the invalidation of a session context. It allows the graceful shut down of a session and the option to reuse the identifier for a new connection. The LLCP stack can manage multiple connections over a single link. Every connection maintains its own state.

The session context is defined by the combination of the Source SAP and Destination SAP. The Destination SAP (DSAP) may refer to a reserved service access point. These DSAPs may refer to a reserved service access point to which a specific protocol binding has been defined. SAPs other than those reserved for specific protocol require applications to agree on a common protocol.

The generic link setup is performed by proceeding through the following steps:
1. The LLC stack provides LLCP relevant configuration data to Mode Switch. This particularly includes the content of the General Bytes of $ATR_{REQ\ and\ ATR\_RES}$.

2. The NFC device configured in NFCIP-1 Initiator Mode detects a remote device or tag by the means of the Mode Switch component
3. The NFCIP-1 anti-collision procedure determines that a single remote device is capable of communicating via the NFCIP-1 protocol.
4. The local LLCP device advertises its LLCP capability during the initialization of the NFCIP-1 protocol by the use of the Generic Bytes which are provided by the LLCP stack.
5. After having sent the ATR_REQ command the local LLCP device will receive the NFCIP-1 initialization response (ATR_RES), which contains the capabilities of the remote device
6. Mode Switch will notify the LLCP stack and the LLCP stack will read out the gathered data.
7. The data is verified by LLCP the Initiator and checked against the NFC and LLCP compliancy rules
8. If the procedure was according to NFCIP-1 and if the General Bytes of the ATR_REQ/ATR_RES was well formed, the LLCP link is set up From the RF protocol point of view, the link for the initiator is set up according to the following procedure:
1. Perform an anti-collision procedure according to the detected technology
   a. 106 kBit/s Passive Mode:
      The Initiator performs the anti-collision and selection procedure up to SEL_REQ and SEL_RES. If according to ISO/IEC18092 SEL_RES bit6 is set to 1, the Initiator assumes that the Target is supporting the NFCIP-1 protocol
   b. 212 kBit/s Passive Mode
      The Initiator performs the anti-collision procedure by performing POLLING_REQUEST and POLLING_RESPONSE. If according to ISO/IEC18092 the NFCID-2 prefix bytes are set to 01h FEh, the Initiator assumes that the Target supports the NFCIP-1 protocol
   c. 424 kBit/s Passive Mode
      This procedure is exactly the same as for 212 kBit/s.
2. In order to activate NFCIP-1, the Initiator prepares the ATR_REQ according to ISO/IEC18092.
3. The Initiator sends the ATR_REQ and expects an ATR_RES response
4. The Initiator verifies the correctness of the ATR_RES according to ISO/IEC18092. Moreover the Initiator checks whether the General Bytes are formatted correctly.
5. If the General Bytes are well formed, the Initiator assumes that the remote device is capable of communicating via LLCP. The LLCP link can now be set up. The next NFCIP-1 DEP frame already contains a valid LLC frame.

From the RF protocol point of view the procedure for the target role is as follows:
1. If the Target intends to communicate via LLCP, the Target acts according to ISO/IEC18092. Consequently, the Target gets selected and can expect an ATR_REQ
2. Once the ATR_REQ is received the target first verifies if the ATR_REQ is well formed according to ISO/IEC18092
3. Besides the verification of ATR_REQ the Target checks whether the General Purpose Bytes are properly formatted. If this is the case the Target can assume that the Initiator intends to set up an LLCP link.
4. If the ATR_REQ is specified accordingly, the Target specifies the ATR_RES according to ISO/IEC18092 and furthermore sets the General Purpose Bytes.
5. Once the ATR_RES is issued, the Target can assume that the link is set up and can therefore assume that the next received frame is the first LLC frame.

The NFCIP-1 protocol is based on a master/slave model. The NFCIP-1 Initiator can be seen as the master, which initiates and controls all the communication with the Target(s). The NFCIP-1 Target can be seen as a slave, which is only allowed to respond to commands issued by the Initiator. The Target has therefore no means to initiate any communication on NFCIP-1 level.

This model is appropriate for cases where the roles are pre-defined due to physical characteristics. However, this is not true any more for peer-to-peer cases, where the roles cannot be determined before the link is set up. In such cases it is essential that both devices have the same properties. This basically implies that both devices can initiate data exchange at any point in time—without considering the role determined beforehand.

The symmetrical behavior can be realized by sending command/response pairs in a periodic manner—even if there is no payload to exchange. This especially enables the NFCIP-1 Target to "send" data within a certain time frame because the Initiator has to periodically issue LLC frames—regardless of whether the frames contain payload data or not.

The symmetry feature is based on the following assumptions:
1. The LLCP link is established implicitly and is maintained as long as the remote peer is within the operating range.
2. LLCP is not responsible for queuing. For timeout considerations the LLCP stack assumes only one frame in the send/receive queue.
3. LLCP is designed in a way that the incoming payload (i.e. I or UI frame) does not influence the next outgoing payload. This has the advantage that the device is able to send data even if the received data is not processed yet.
4. The turnaround time as specified below does not consider any error handling. Hence if a transmission error has occurred and the link has to perform error recovery the LLCP link may not hold the maximum response times.

The LLC protocol supports three different types of commands. Every LLC command or response can be categorized into one of these types:

Information (I Frame)—Numbered information transfer. I-formatted commands and responses are reliable and contain numbering information and the payload itself Supervisory (S Frame)—Supervisory frames serve to perform control functions for type 2 and link level operation.

Unnumbered (U Frame)—Supervisory frames serve to perform un-sequenced information transfer, also known as type 1 data transmission.

Every LLC frame, which contains one of the three different command types complies to the following format:

TABLE 1

| LLC Frame Format | | | |
| --- | --- | --- | --- |
| DSAP Field | SSAP Field | Control Field | Information Field |

TABLE 2

Command Table

| Commands | Bit[7] | Bit[6] | Bit[5] | Bit[4] | Bit[3 ... 0] |
|---|---|---|---|---|---|
| UI | 0 | 0 | 1 | 0 | 0000 |
| I | 0 | 1 | 0 | 0 | 0000 |
| RR | 0 | 0 | 0 | 0 | 0001 |
| RNR | 0 | 0 | 0 | 0 | 0011 |
| CONNECT | 0 | 0 | 0 | 0 | 0100 |
| DISCONNECT | 0 | 0 | 0 | 0 | 0101 |
| SYMM | 0 | 1 | 1 | 0 | 0111 |
| FRMR | 0 | 0 | 0 | 0 | 0111 |
| UA | 0 | 0 | 0 | 0 | 0100 |
| DM | 0 | 0 | 0 | 0 | 0101 |
| PAN_CMD | 0 | 0 | 0 | 0 | 0110 |
| PAN_RSP | 0 | 0 | 0 | 0 | 0111 |

TABLE 3

SYMM Frame

| DSAP | SSAP | Control |
|---|---|---|
| 00 h | 00 h | SYMM |

The SYMM (Symmetry) command/response is used to maintain the symmetry. The SYMM command/response is sent via a NFCIP-1 command or NFCIP-1 response if there is no payload or acknowledgement pending. This command does not transmit any information field.

SYMM frames may have two different timeout values depending on the role:

Initiator:
  If the Initiator receives a SYMM frame it ensures that the Initiator sends an LLC command within the time window as defined by the turnaround timer $T_{TT}$.

Target:
  If the Target receives a SYMM frame it ensures that the device responds with an LLC frame within the Response Waiting Time (RWT) as defined by NFCIP-1.

Figure 4:
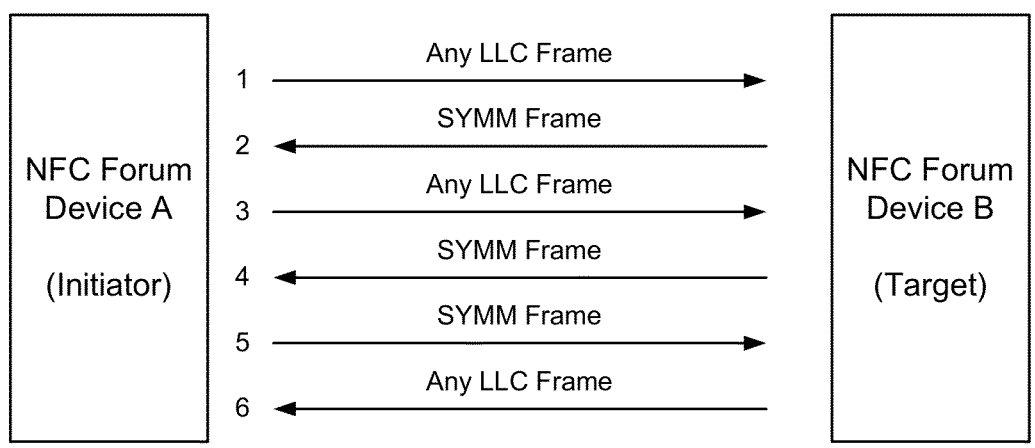
FIG. 4 illustrates how a SYMM frame is used.

FIG. 4 shows how a SYMM frame is used. With reference to the figure,

1. Device A sends an LLC frame to Device B (e.g. a CONNECT frame)
2. Device B does not have anything to send, therefore it delivers a SYMM frame in order to fulfill the roundtrip constraints
3. Device A again sends some LLC frame (e.g. a UI frame)
4. Device B does not have any payload to deliver, therefore a SYMM frame needs to be sent
5. Device A neither has to send payload, therefore it needs to commit a SYMM frame
6. Device B delivers some data (e.g. a UA frame to the corresponding CONNECT frame)

The SYMM packet guarantees that the command/response scheme is maintained, and that the roundtrip time constraints can be fulfilled.

NFC Link Management

As explained above, the half-duplex communication link between devices is used in a strictly turn-taking methodology with one device sending and the other device responding with data or control information of its own before the first device may send new information. In the event that neither device has data to send, an empty frame, or symmetry primitive (SYMM) is sent. This allows the sending device to regain use of the link when the receiving device has no data to send. When neither device has data or control information to send, SYMM primitives will be sent in both directions, and the link may be said to be idle.

The continuous transmission of SYMM primitives when no data is actually being exchanged represents an unnecessary drain on the battery resources of portable devices. In this case, it is desirable to extend the turnaround time without causing a communications failure. However, when data is being transmitted, data throughput can be maximized by allowing the sending device to regain control of the link as soon as possible. In that case, the shortest possible turnaround time is desirable. The methods and systems described herein adjusts turnaround time in the receiver to optimize battery use while maximizing the data throughput.

In one embodiment, the delay time or transmission delay increases the longer the link remains idle. To calculate the delay time, in one embodiment the turnaround time during idle periods can be seen as the product of an idle factor and an idle delay. The idle delay is a time duration. The idle factor may be computed as follows: Initially, when the link is first established the idle factor is set to zero. Each time a SYMM primitive is received, the idle factor is incremented. Each time a primitive other than SYMM is received, then the idle factor is reduced or reset to zero. The turnaround time, which is the product of the idle factor and the idle delay, but not less than a small processing delay, varies between nearly zero and some maximum value, scaled by the idle factor.

$$T_{TT} = F_{idle} \cdot T_{delay}$$

where, $T_{Proc} \leq T_{TT} \leq T_{TMax}$

Figure 5:
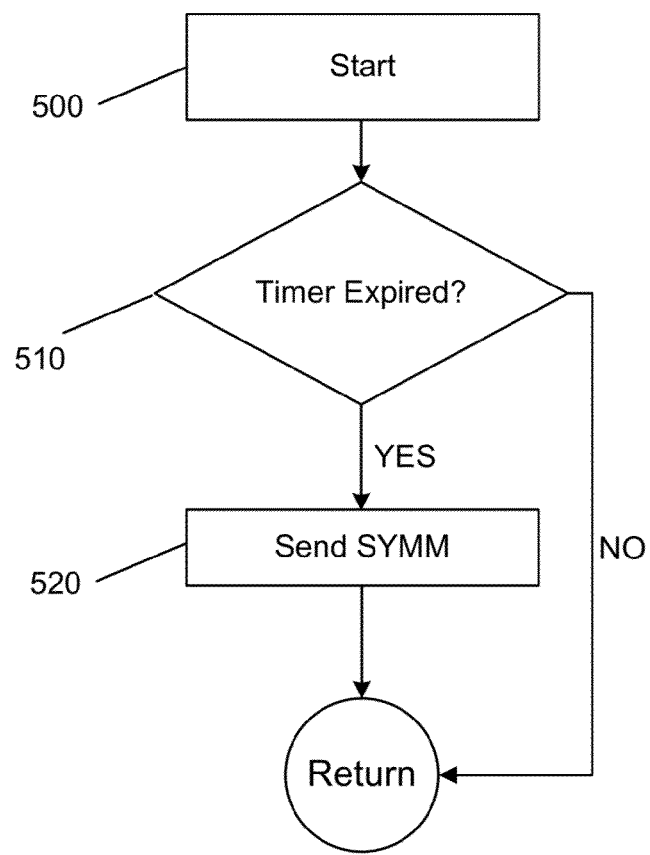
FIG. 5 is an exemplary flow chart of the use of a timer to determine whether to transmit a SYMM primitive.

FIG. 5 depicts one embodiment of the use of a timer to determine when a synchronization message such as a SYMM primitive should be transmitted. The process starting at step 500 might be initiated during each cycle of a communication process or on a periodic basis. At step 510, the process determines if the timer has expired. If a countdown timer is used, then the timer expires when the timer has decremented to zero. However, other timer implementations are possible and the methods and systems described herein may be embodied with various hardware or software schemes and should be not limited to a particular timer implementation. If the timer has expired, then in step 520 a SYMM primitive is transmitted. Other types of synchronization or status messages may be sent as required by the particular protocol.

If the device has most recently received a control primitive other than the SYMM primitive, and has not recently received an information frame, then the turnaround time can be determined according to the type of the received control primitive and by local implementation concerns. The receiver determines if the received message is one that is predetermined to correspond to a delay. For example, a lookup table can be used to determine the various types of control primitives or messages that require adjustments to the turnaround timer.

In one embodiment, the receiver determines if there is an outstanding acknowledgement or data pending in its queue. If there is no pending data, then the transmission of the SYMM primitive is delayed according to a value determined by the type or status of the received message. Such a delay can simply be determined by a table of delay values corresponding to various selected messages or message types. Alternatively, the delay can be determined according to a sliding scale, mathematical relationship, or any number of other methods.

Figure 6:
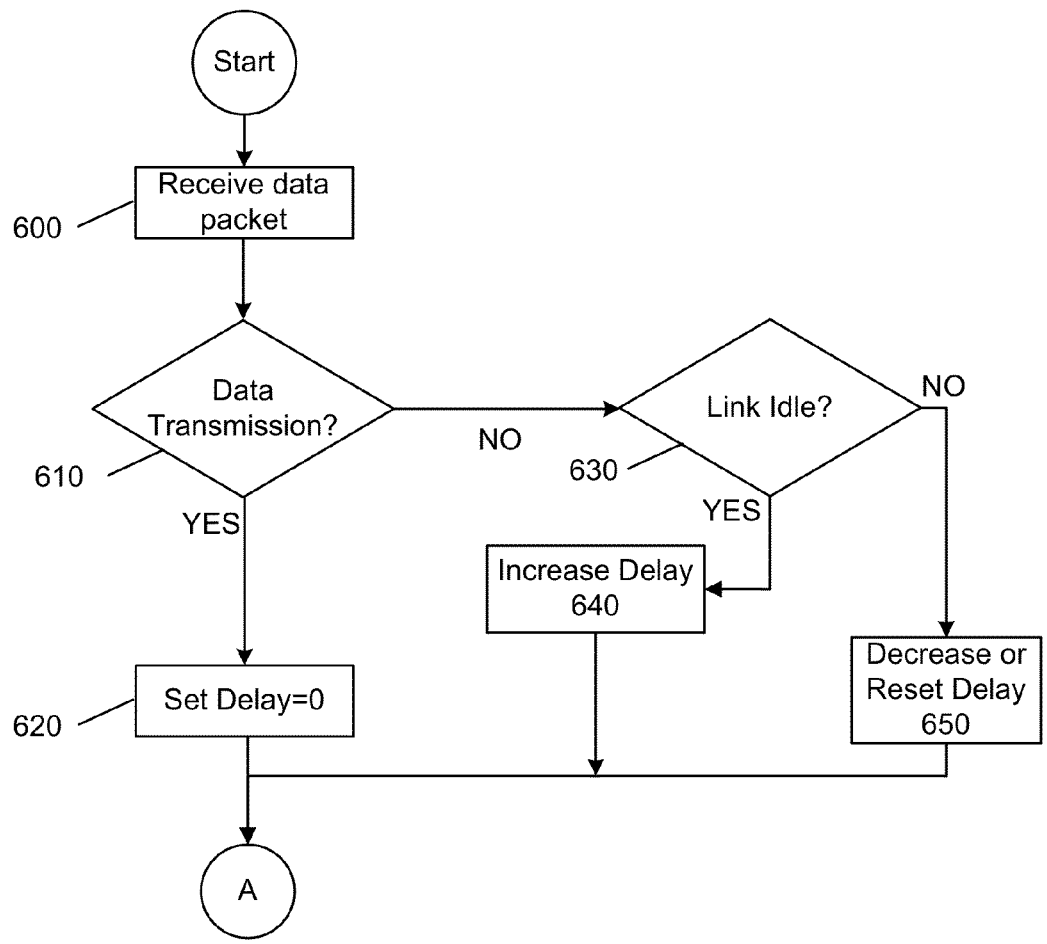
FIG. 6 is an exemplary flow chart depicting the processing of incoming data packets in a half duplex link.
Figure 7:
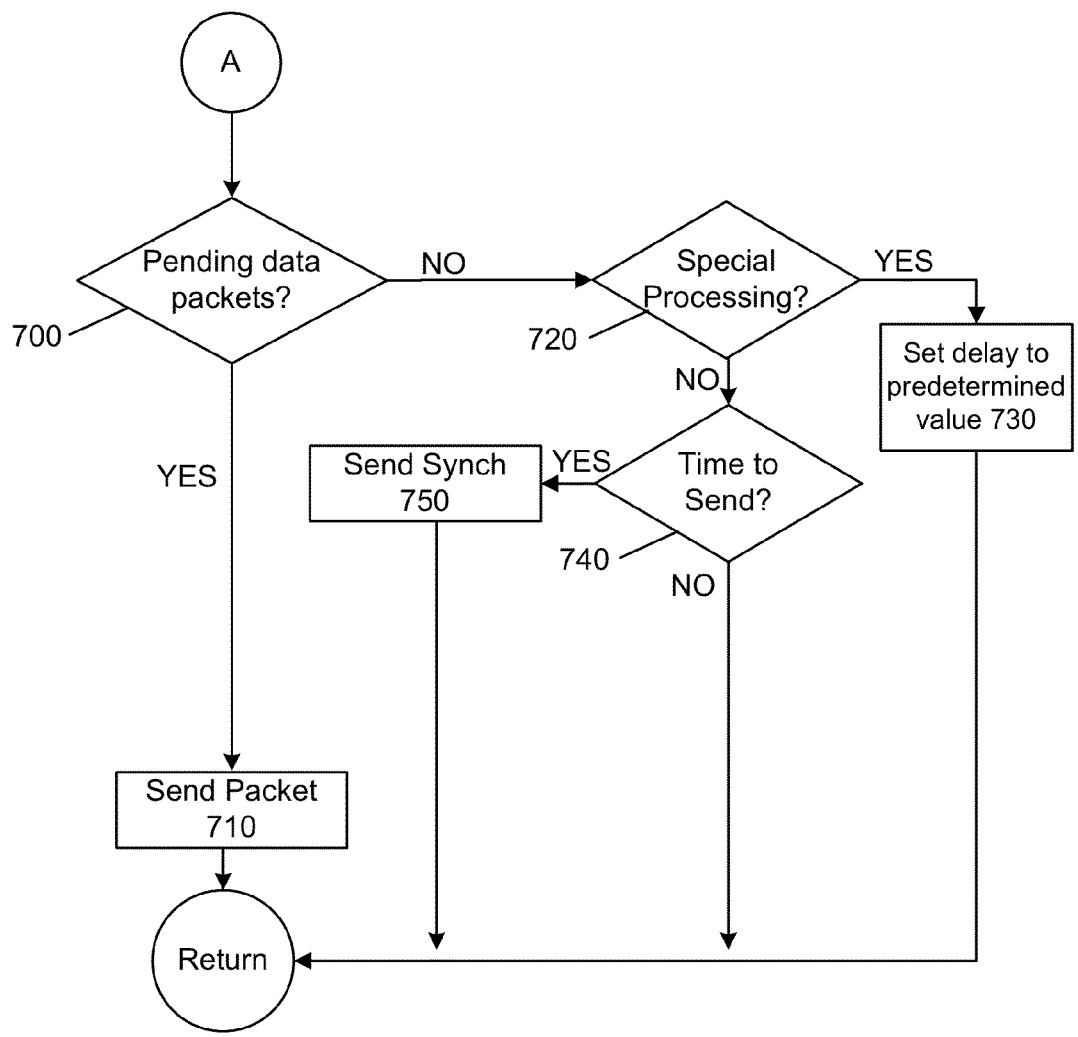
FIG. 7 is an exemplary flow chart depicting the processing of incoming data packets in a half duplex link.

FIGS. 6 and 7 depict an exemplary implementation of the methods and systems described herein in a half duplex peer to peer communication environment. In step 600 a data packet is received by a first device, and in step 610 the process determines if the data packet indicates that a data transmission is in process. If so, the transmission delay is set to zero in step 620. If the data packet does not indicate that a data transmission is in process, then in step 630 the process determines if the data packet indicates that the link is idle. For example, the data packet may be an "I'm Alive" message to indicate that the sending device is in communication but has no data to send. If the link is idle, then in step 640 the delay is incremented. If the link is not idle, indicating that a control packet may have been received, then the delay may be decremented or set to zero depending upon the type of control data received. The process may make this determination in accordance with a lookup table or other methods as noted above. The delay may also be determined by local implementation concerns.

Continuing with FIG. 7, the process may then determine if the receiving device has an outstanding acknowledgement or data pending in its queue in step 700. If so, then the packet is transmitted in step 710. If not, the process determines in step 720 if the received packet requires special processing, i.e., the packet is predetermined to correspond to a delay. Such a delay can simply be determined by a table of delay values corresponding to various selected messages or message types as noted above. Alternatively, the delay can be determined according to a sliding scale, mathematical relationship, or any number of other methods. If there is no pending data, then the transmission of a synch message will be transmitted if in step 740 it is determined that the delay time period has expired.

In an exemplary embodiment, when receiving a CONN (connect) primitive and when no outstanding acknowledgment or data is queued, a typical receiver not implementing the methods and processes described herein might respond immediately with a SYMM primitive. In one embodiment, the transmission of the SYMM primitive is delayed such that the receiver's link manager can process the connection request and generate a response (though not so long as to violate the receiver timeout requirement). While not required by the LLCP specification, allowing the receiver to set the delay according to selected high-priority requests before responding will reduce the number of times the link must be turned around and the number of SYMM frames that must otherwise be exchanged. This improves both responsiveness and battery resource usage.

In yet another exemplary embodiment, when receiving a Receiver Not Ready (RNR) primitive, the link turnaround time may be reduced or minimized to enable the remote peer to clear its busy condition by sending Receiver Ready (RR) with reduced delay. This may seem counter-intuitive that a busy condition may reduce the turnaround time. But it can be seen that throughput is improved by minimizing the delay following the moment at which the remote peer is again able to receive and when it may notify the other end, using the RR primitive, that it is no longer busy.

Figure 8:
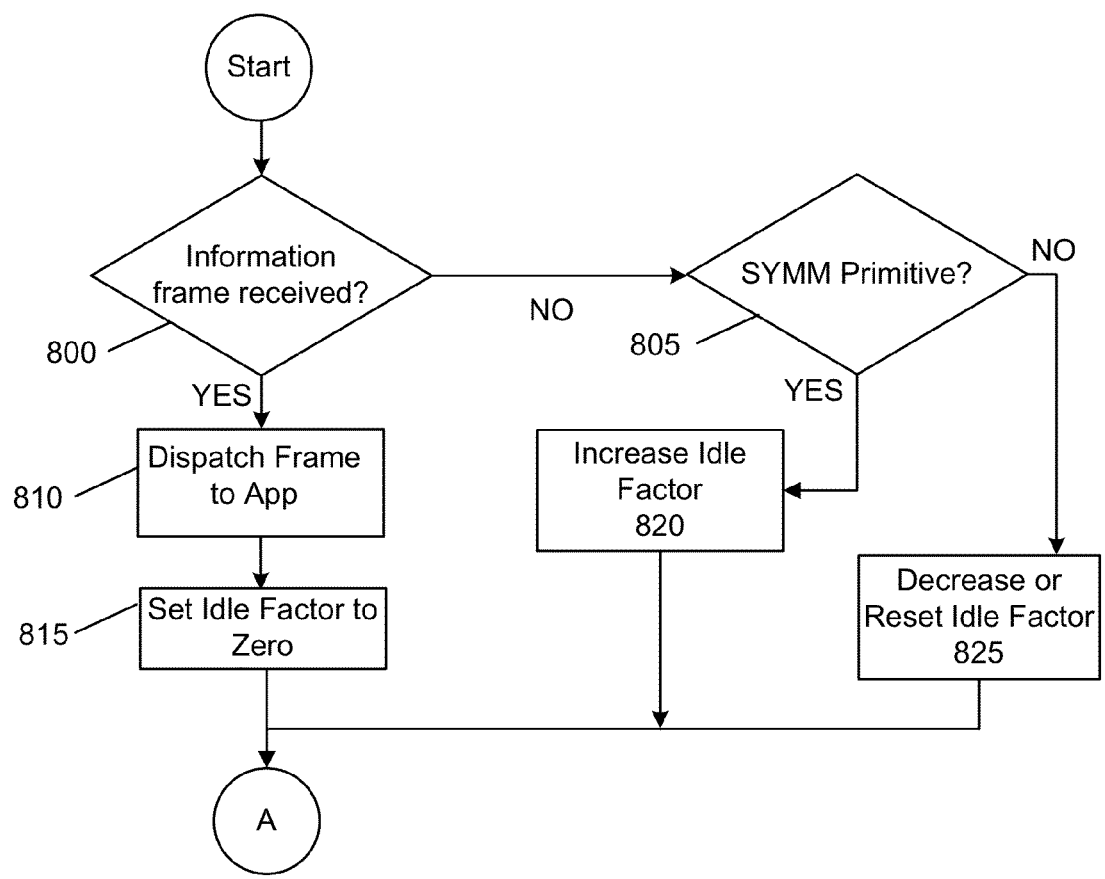
FIG. 8 is an exemplary flow chart depicting the processing of incoming data packets in an NFC link.
Figure 9:
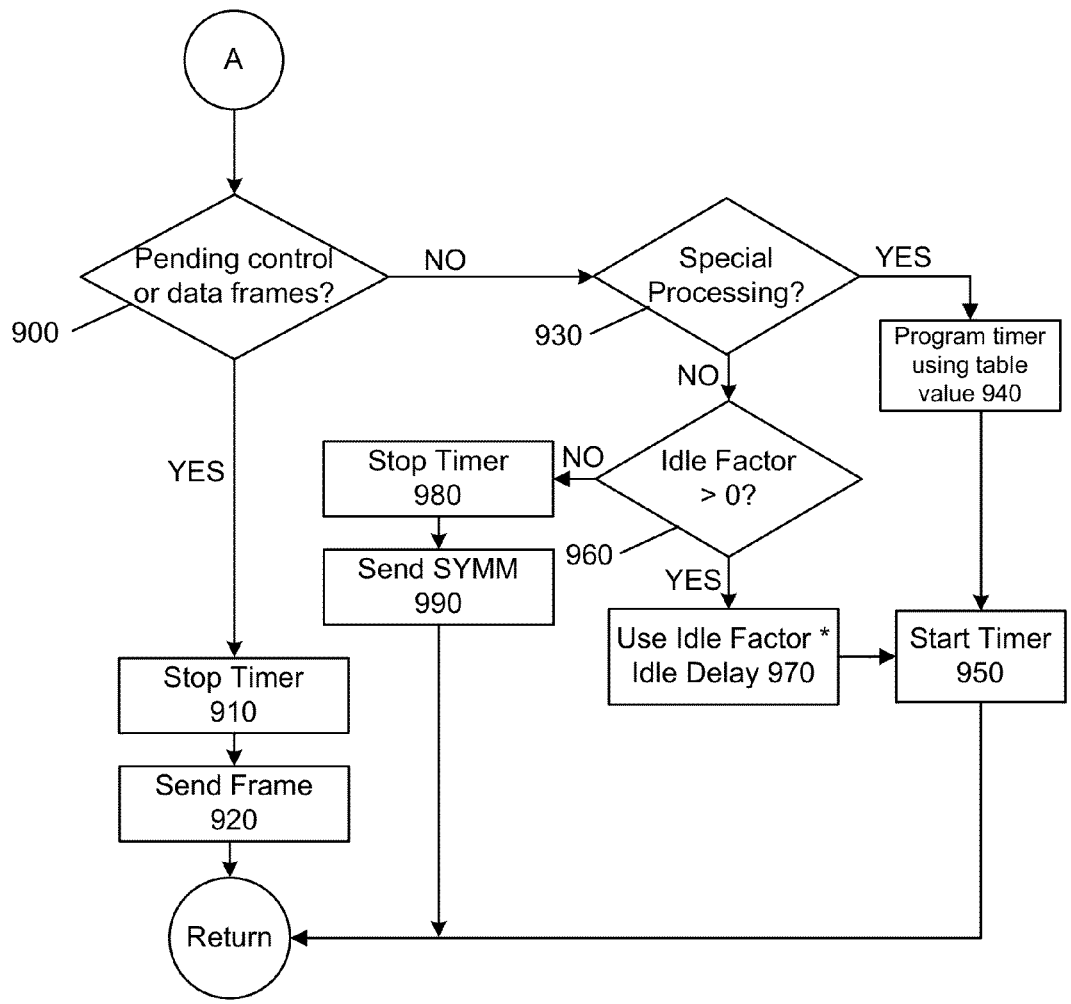
FIG. 9 is an exemplary flow chart depicting the processing of incoming data packets in an NFC link.

According to a preferred embodiment illustrated in FIGS. 8 and 9, a receiving NFC device determines if an information frame has been received in step 800. If so, then the frame is dispatched to the appropriate application in step 810, and the idle factor is set to zero in step 815. If there was no information frame received, then the process determines if a SYMM primitive was received in step 805. If so, then the idle factor is increased in step 820. Otherwise, the idle factor is decreased or reset in step 825. If there are any pending control or data frames (step 900), then the timer is stopped in step 910, and the pending frames are transmitted immediately, or as soon as possible thereafter, subject to the flow control status of the sending device, and the process returns.

When the receiving device has no pending control or data messages to transmit, the LLCP specification requires the device to send a SYMM after delaying up to a specified maximum turnaround time. The actual delay time and method of determining the delay time is left unstated in the LLCP specification. In a preferred embodiment the value of the delay time is determined before sending a SYMM primitive in accordance with the types of link frames recently received.

If the received frame indicates that the data is a priority or designated frame and should receive special processing (step 930), then the timer is programmed using a table value or other predetermined method (step 940). The timer is started in step 950, and the process returns.

If the last received frame does not require special processing, then the process determines if the idle factor is greater than zero in step 960. If so, then in step 970 the (idle factor*idle delay) value is used, and the timer is started in step 950. Otherwise, then the timer is stopped in step 980, and the SYMM primitive is transmitted in step 990, whereupon the process returns.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. In a device configured to communicate with at least one other device in a half duplex link, a method for coordinating data communication in the half duplex link, the method comprising:
   determining, by the device, a type of information included in a received data packet;
   initializing, by the device, a data transmission delay and storing the data transmission delay in the device;
   decreasing said data transmission delay when said type indicates that data transmission on said link is active, and increasing said data transmission delay when said type indicates that data transmission on the link is idle;
   transmitting, by the device, a data packet to the at least one other device when a data packet is pending; and
   when no data packet is pending, transmitting, by the device, a synchronization packet to the at least one other device after lapse of said data transmission delay.

2. The method of claim 1, further comprising determining said data transmission delay using a timer, said timer further comprising the product of an idle factor and an idle delay.

3. The method of claim 2, wherein said idle factor is computed as follows:
   when the link is first established the idle factor is set to zero;

incrementing said idle factor when said type indicates that data transmission on said link is idle; and reducing said idle factor when said type indicates that data transmission on said link is active.

4. The method of claim 3, wherein said idle factor is set to a predetermined value when said type indicates that data transmission on said link is active and said type comprises a control data packet.

5. The method of claim 4, wherein said transmitting the synchronization packet further comprises:

starting said timer when the idle factor is greater than zero, and transmitting the synchronization packet when said timer expires.

6. The method of claim 4, wherein said predetermined value is at least one of: based upon a priority of said data packet, a random time period, negotiated with a second device, a sliding scale, or mathematical relationship.

7. A method for communicating data by a mobile computing device, the method comprising:

determining, by the mobile computing device, a type of information included in a received data frame;

setting, by the mobile computing device, a data transmission delay to zero when said type is an information frame, increasing said data transmission delay when said type is a synchronization frame, and otherwise setting said data transmission delay to a predetermined level, the data transmission delay comprising at least an idle delay;

transmitting, by the mobile computing device, a pending data frame when at least one data frame is pending; and when no data frame is pending, transmitting, by the mobile computing device, a synchronization message after lapse of said data transmission delay.

8. The method of claim 7, wherein said data transmission delay comprises a product of the idle delay and an idle factor.

9. The method of claim 7, wherein said idle factor is computed as follows:

when the link is first established the idle factor is set to zero;

when said type is a synchronization frame said idle factor is incremented; and otherwise said idle factor is reduced or set to zero.

10. The method of claim 9 wherein said idle factor is set to a predetermined value when said type is a control frame.

11. The method of claim 10, wherein said transmitting further comprises:

starting said timer when the idle factor is greater than zero, and transmitting a synchronization frame when said timer expires.

12. The method of claim 10, wherein said idle factor is determined according to at least one of: a mathematical relationship, a priority of said data frame, or a random time period.

13. The method of claim 7, wherein said data transmission delay is negotiated with a second device.

14. A mobile computing device comprising:

a receiver configured to receive a data frame;

a transmitter configured to transmit a pending data frame; and a transmission control component configured to:

determine a type of information included in the received data frame, set a data transmission delay to zero when said type is an information frame, increase said data transmission delay when said type is a synchronization frame, and otherwise set said data transmission delay to a predetermined level, the data transmission delay determined based on at least an idle delay;

command said transmitter to transmit said pending data frame after lapse of said delay when at least one data frame is pending; and command said transmitter to transmit a synchronization message after lapse of said data transmission delay when no data frame is pending.

15. The device of claim 14, wherein said data transmission delay is determined as a product of the idle factor and an idle delay.

16. The device of claim 14, wherein said idle factor is computed as follows:

when the link is first established the idle factor is set to zero;

when said type is a synchronization frame said idle factor is incremented; and otherwise said idle factor is reduced or set to zero.

17. The device of claim 16 wherein said idle factor is set to a predetermined value when said type is a control frame.

18. The device of claim 17, wherein said transmission control component also starts said timer when the idle factor is greater than zero, and transmits a synchronization frame when said timer expires.

19. The device of claim 17, wherein said idle factor is determined according to at least one of: a mathematical relationship, a priority of said data frame, or a random time period.

20. The device of claim 14, wherein said data transmission delay is negotiated with a second device.

* * * * *